Dec. 12, 1939.    S. J. NORDSTROM    2,182,930
PLUG VALVE
Original Filed Jan. 23, 1936
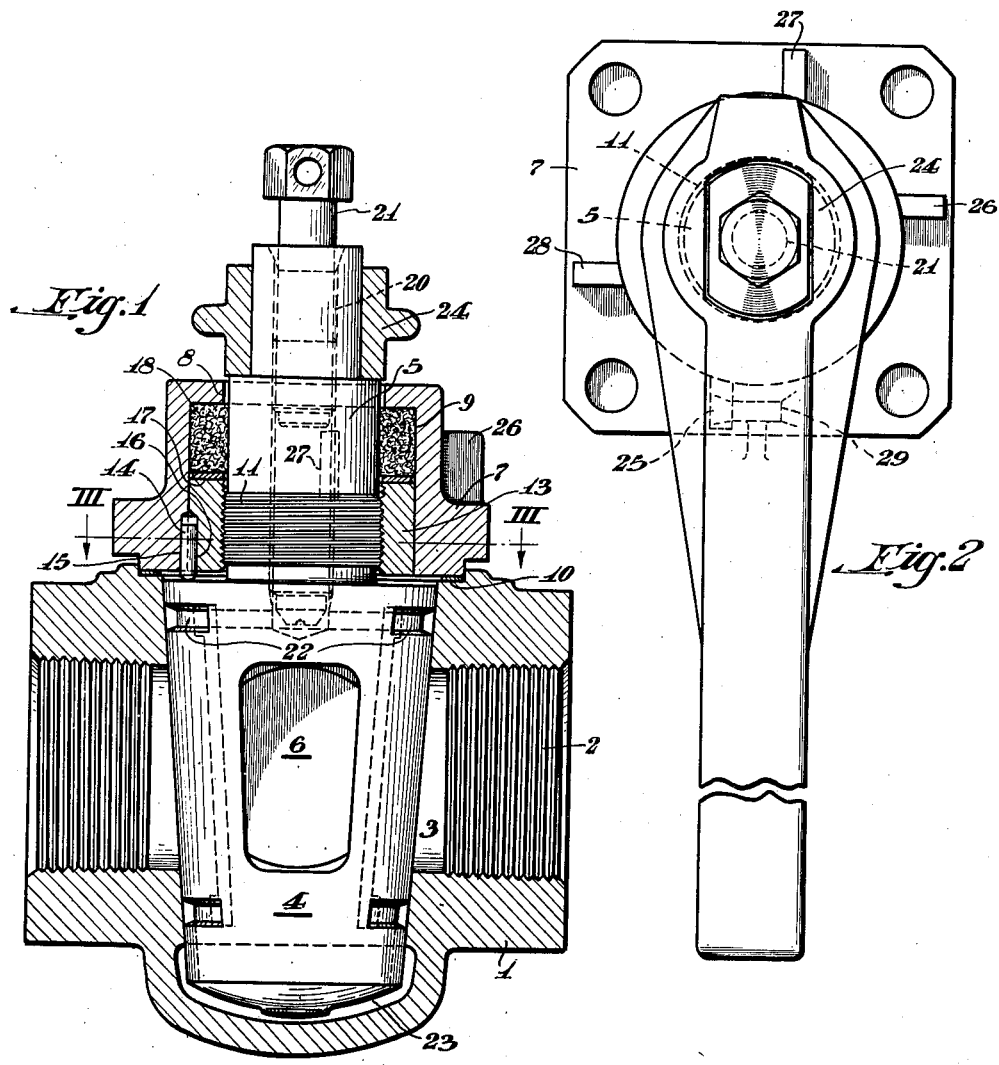
Fig.1
Fig.2
Fig.3
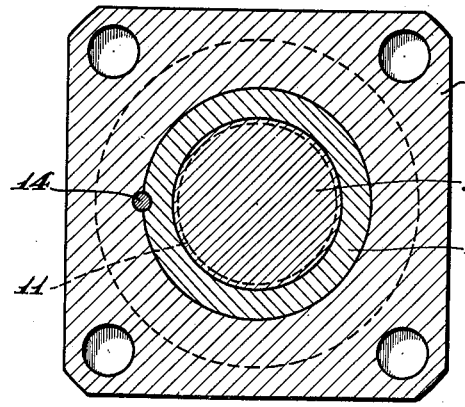
INVENTOR.
SVEN J. Nordstrom,
BY
Lewis D. Konigsford
ATTORNEY.

Patented Dec. 12, 1939

2,182,930

UNITED STATES PATENT OFFICE 2,182,930

PLUG VALVE

Sven J. Nordstrom, Piedmont, Calif., assignor to Merco Nordstrom Valve Company, Pittsburgh, Pa., a corporation of Delaware Application January 23, 1936, Serial No. 60,468
Renewed January 5, 1939

5 Claims. (Cl. 251—112)

This invention relates to plug valves, and particularly to tapered plug valves in which a tapered plug having a port therethrough is maintained seated in a conical seat. This invention is an improvement on the construction shown in U. S. Patent No. Re. 17,724, issued July 8, 1930.

It is an object of the present invention to provide a plug valve in which the plug is resiliently held in its seat, and wherein the seating pressure on the plug is increased when the valve is turned to closed position and decreased or relieved when the valve is turned to open position.

A further object of the invention is to provide a valve in which the plug is maintained resiliently seated at all times whether in open or closed position, the seating pressure being increased as the valve is turned to closed position and decreased when the valve is turned to open position.

A further object is the provision of a plug valve of the character described which is simple in construction and inexpensive to manufacture, can be easily adjusted and will not become easily disarranged.

In accordance with the present invention, I provide a plug valve wherein a packing gland is threaded either to the stem or casing and maintained against rotation by the other of them. The cover or bonnet of the valve is removable and has a packing chamber to receive packing to prevent leakage around the stem, the packing preferably being superposed on the threaded gland so that the compression of the packing resiliently urges the plug into its seat. The arrangement of threads on the gland and stem or casing is such that when the plug is turned to closed position the threads move the gland against the packing and increase the seating thrust on the plug, and when the valve is turned to open position the packing gland is drawn away from the packing thus relieving the seating thrust on the plug. Suitable stops are provided to limit rotation of the valve plug to one quarter turn. However, the stops preferably are on a wrench separate from the valve which cooperates with a fixed stop on the valve bonnet or casing so that before the valve is installed for operation the valve plug may be rotated a sufficient number of turns to adjust the seating pressure on the plug as desired so as to prevent leakage through the valve in closed position. A lubricant system for the valve is provided whereby the plug may be jacked from its seat by lubricant pressure, and the seating surface of the plug and casing may be lubricated and sealed by lubricant.

The invention will be explained in further detail in connection with the accompanying drawing wherein:

Figure 1 is a vertical section showing the preferred embodiment of the invention;

Figure 2 is a plan view of Figure 1; and

Figure 3 is a horizontal section taken on line III—III of Figure 1.

Referring to the drawing, the invention comprises a valve body 1 having a passageway 2 therethrough for flow of fluid, and a tapered bore 3 formed transversely of the passageway. A tapered plug 4 having a reduced portion providing an integral stem 5 is seated in the bore 3, and has a port 6 adapted to register with the passageway 2 in open position of the valve. A cover 7 is bolted or otherwise secured to the casing 1 so as to practically form a part of the casing, and has a bore 8 therein through which extends the valve stem 5 and a counterbore 9, and a suitable gasket 10 may be provided between the cover and casing to prevent escape of fluid therebetween. The valve stem 5 is threaded at 11 for some distance adjacent its base or juncture with the tapered part of the plug, and an internally threaded packing gland 13 is threaded thereon and is adapted to be received in the suitable recess 9 provided in the valve cover 7. In assembled position the packing gland 13 is held in nonrotatable relation with the cover by means of a dowel 14 inserted in complementary half round bores 15 and 16 in the packing gland and cover. A metal packing washer 17 is seated on the top surface of the packing gland in close proximity to the valve stem 5, and a resilient packing 18 of rubber, asbestos packing or other suitable material is superposed on the packing washer 17 in the recess 9 of the cover.

The lubricating system for the valve is substantially like that described and claimed in Patent No. 1,781,821 issued to me on November 18, 1930, and therefore will not be described in detail. This system comprises an internally threaded lubricant reservoir 20 in the stem adapted to receive a threaded screw 21 for compressing the lubricant, and lubricant is forced by the screw 21 into the grooves designated generally by the numeral 22 in the plug and valve seating surface and into jacking chamber 23 at the bottom of the plug for sealing and lubricating the valve and seating surfaces, and jacking the plug from its seat to release it for turning.

The outer end of the stem 5 is formed noncircular to receive an operating wrench 24 whereby the valve may be turned. The cover 7 has four stops 25, 26, 27 and 28 arranged to cooperate with a stop 29 on the wrench 24 whereby rotation of the plug is limited to substantially 90° for opening and closing same.

The assembly and operation of the invention now will be described.

The packing 18 is inserted in the chamber 9 of the cover, and the washer 17 is then placed on the packing. The packing gland 13 is then placed on the ring 17, and the dowel 14 is inserted in the bore 15, 16 formed in the packing gland and cover to hold the packing gland against rotation. The stem 5 of the plug is then inserted through the packing gland, washer, packing and hole 8 and is threaded into the packing gland as far as it will easily go. The assembly of the cover and plug is then inverted and the plug is inserted in the bore 3 and the cover bolted in place to the casing. The plug 4 may or may not be properly resting on its seat at this stage of the assembly operation. This can be determined readily by rotating the valve with the wrench in inverted position. If the plug is off its seat it may be turned by the wrench in inverted position a sufficient number of times so that the engagement of the threads 11 on the packing gland 13 and stem 5 advance the plug into its seat. A suitable quantity of lubricant then can be forced through the grooves of the plug and jacking chamber by screw 21 to insure proper lubrication and sealing of the valve. The valve is then tested for leakage, and if leakage occurs when the valve is properly lubricated the plug is rotated further into its seat until when the plug is in closed position no leakage occurs.

In operation the valve plug is turned to open position in counterclockwise direction as seen in Figure 2. It will be observed that the reaction of the threads 11 on the plug stem and packing gland 13 tends to relieve the pressure of the plug on its seat and thus makes the valve turn easier in opening position. When the valve is to be closed the threads 11 advance the plug into its seat against the reaction of the packing gland and more or less wedge the plug into its seat to provide a complete seal against the leakage of fluid, which is further insured by the lubricant system in the plug surface. The packing 18 at the top of the plug prevents leakage of line fluid or lubricant to the exterior, and resiliently maintains the plug on its seat so that it can be jacked by lubricant pressure in chamber 23 to release it for turning at any time.

As the invention may be embodied in other specific forms without departure from the spirit or essential characteristics thereof, the present prefered embodiment is therefore to be considered as illustrative rather than restrictive of the invention.

What is claimed and desired to be secured by United States Letters Patent is:

1. In a valve, a casing having a passageway therethrough for flow of fluid and a valve seat therein disposed transversely of the passageway, a valve plug located in said seat and having a port therethrough adapted to be placed in register with the passageway, a cover for the seat forming part of the casing, an operating stem on said plug threaded adjacent said plug and extending through said cover, a packing gland threaded on said stem, said cover having a recess around the stem for slidably and non-rotatively receiving said gland, packing in said recess between and bearing on said gland and cover to resiliently urge the plug into its seat and yieldingly limit movement of said gland toward said packing, said gland being movable for a substantial distance along said stem as said stem is turned during assembly and adjustment to determine the force with which said plug is urged toward its seat, fixed stop means on said casing, and an operating member on said stem distinct from said gland having stop means cooperating with said fixed stop means to limit rotation of said plug to substantially a quarter of a turn after the valve has been assembled and adjusted and to prevent said gland from coming in contact with said plug.

2. In a valve, a casing having a passageway therethrough for flow of fluid and a valve seat therein, a valve member in said casing co-operating with said seat and rotatable during normal opening and closing operations of the valve through a predetermined angle, a cover for the casing, a threaded operating stem for said valve member extending through said cover and surrounded by a recess in the cover, a packing gland threaded on said stem and slidably and non-rotatively held in said recess, and compressible packing in said recess between said gland and said cover, said gland being freely slidable for adjustment along said recess by rotation of said stem over a range which lies outside the range in which the gland moves during normal valve opening and closing operations and said stem being rotatable through more than said predetermined angle to move said gland to adjust the compression of the packing and vary the seating pressure of the valve.

3. In a valve assembly, a casing having a passageway therethrough for the flow of fluid and a valve seat therein, a valve member in said casing cooperating with said seat and rotatable during normal opening and closing operations of the valve through an angle of substantially ninety degrees, a cover for the casing, an operating stem for said valve member extending through said cover and surrounded by a recess in the cover, packing means in said recess surrounding said stem, and means for adjusting the compression of the packing by rotation of said stem to determine the seating pressure of said valve, said stem being rotatable through more than ninety degrees to effect said adjustment.

4. In a valve, a casing having a passageway therethrough for the flow of fluid and a valve seat therein, a valve member in said casing cooperating with said seat and rotatable during normal opening and closing operations of the valve through an angle of substantially ninety degrees, a cover for said casing, an operating stem extending through said cover and surrounded by a recess in said cover, a packing gland surrounding said stem and freely slidable and non-rotatably disposed in said recess and means interconnecting the stem and gland for adjusting the compression of the packing upon rotation of said stem, said stem being rotatable through more than ninety degrees to effect said adjustment to thereby determine the seating pressure of the valve.

5. In a valve; a casing having a passage therethrough for the flow of fluid and a valve seat therein disposed transversely of the passageway; a valve plug located in said seat and having a port therethrough adapted to register with the passageway, said plug being rotatable through an angle of substantially ninety degrees during normal opening and closing operations of the valve; a rigid cover for the seat forming part of the casing; an operating stem on said plug threaded adjacent said plug and extending through said cover; a packing gland threaded on said stem, said cover having a recess around said stem for slidably receiving said gland; and means for preventing relative rotation between said gland and cover when the valve stem is rotated comprising cooperating longitudinal surface grooves at adjacent surfaces of said gland and cover and a pin within said grooves, said gland being capable of unrestricted longitudinal movement along said stem when said stem is turned through an angle of more than ninety degrees during adjustment of the seating pressure of the valve.

SVEN J. NORDSTROM.